Jan. 26, 1943.  H. R. SUMMERHAYES, JR  2,309,481
FREQUENCY MONITORING SYSTEM
Filed March 1, 1941
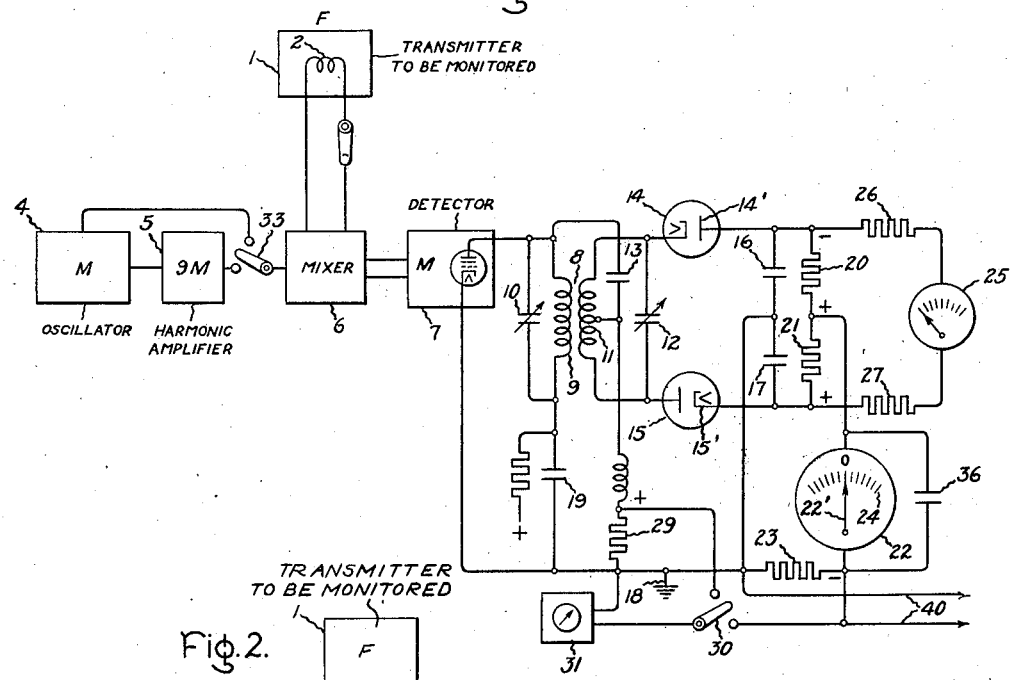
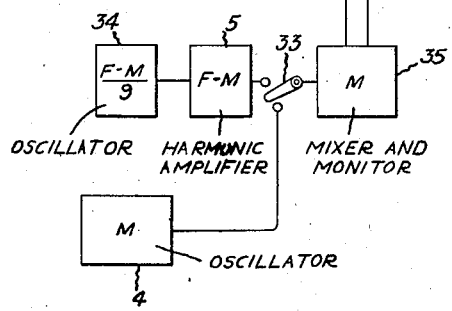
Inventor:
Harry R. Summerhayes, Jr,
by Harry E. Dunham
His Attorney.

Patented Jan. 26, 1943

2,309,481

UNITED STATES PATENT OFFICE 2,309,481

FREQUENCY MONITORING SYSTEM

Harry R. Summerhayes, Jr., Schenectady, N. Y., assignor to General Electric Company, a corporation of New York Application March 1, 1941, Serial No. 381,284

6 Claims. (Cl. 250—17)

My invention relates to frequency monitoring systems for use particularly in frequency modulation systems and it has for its object to improve the sensitivity of such systems.

A further object of my invention is to provide a frequency monitor which is simple, and accurate, and which may be economically employed to monitor the frequency of transmitters such as those used in frequency modulation broadcast systems.

Still a further object of my invention is to provide such a system which responds to and indicates with desired sensitivity and accuracy the average frequency of a frequency modulated wave.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents an embodiment of my invention and Fig. 2 represents a modification thereof.

Referring to Fig. 1 of the drawing, I have indicated at 1 a transmitter, the frequency of which is to be monitored. This transmitter may, for example, be one of the ordinary frequency modulation transmitters such as are used in broadcasting and other radio signal systems. A small electromotive force produced by this transmitter having the frequency at which the transmitter operates, may be obtained from the transmitter in any suitable way as by induction into a coil 2 indicated in the rectangle 1. This electromotive force may be supplied to the monitor which may comprise apparatus indicated by the rectangles 4, 5, 6 and 7 plus the other equipment shown at the right hand of the figure and which will presently be described.

The rectangle 4 may comprise a suitable oscillator of stable frequency, such as one of the crystal controlled type, the output of which is supplied through a harmonic amplifier 5 to the input of a mixer 6 to which oscillations from the transmitter are also supplied. These two trains of oscillations from the harmonic amplifier 5 and from the coil 2 in the transmitter are mixed and supplied to a detector 7 where they beat together to produce oscillations having a frequency equal to the difference in frequencies of the two oscillations supplied to the mixer. Oscillations of the difference frequency are supplied to a transformer 8 having a primary winding 9 tuned by means of a condenser 10 to the beat frequency and having a secondary winding 11 tuned by condenser 12 to this frequency. The high voltage terminal of the primary winding of transformer 8 is connected through a condenser 13 to the midpoint of the secondary winding and the opposite terminals of the secondary winding are connected through rectifiers 14 and 15 and condensers 16 and 17 to ground at 18 and thence through condenser 19 to the other terminal of the primary. Since the primary winding and secondary winding of the transformer are tuned to the frequency of oscillations supplied thereto the voltage across the two rectifiers is equal when the frequency is of the proper value. This is because the secondary voltage is in quadrature phase relation with the primary voltage. This phase relation, however, exists only when the frequency of supplied oscillations is that to which the windings are tuned. Upon any shift in this frequency the secondary voltage shifts in a corresponding direction, the two voltages applied to one rectifier becoming more nearly in aiding phase, and the two voltages applied to the other rectifier become in more nearly opposed phase relation. Thus, if the frequency increases, the voltage on one rectifier increases and that on the other decreases, whereas, if the frequency decreases, the voltage on the one rectifier decreases whereas that on the other increases.

The anode 14' of the diode 14 is connected to the cathode 15' of the diode 15 through a pair of equal resistances 20 and 21, and the point between these two resistances is connected to ground through a center reading meter 22 and a resistance 23. The diodes 14 and 15 are poled to pass current through this meter 22 in opposite directions and accordingly when the frequency is of the correct value, no current exists in the meter and its index 22' assumes the central position on its scale 24. If the frequency increases, the index 22' deflects to the right, whereas, if it decreases, it deflects to the left, in accordance with the polarity and intensity of the current through the winding of the instrument. Thus the frequency of the oscillations to be monitored may be directly read upon this current responsive instrument 22.

Of course, in order that the deflection of the index 22' may be a true indication of the frequency of the oscillations supplied to the transformer 8, it is necessary that the intensity of those oscillations be of the value for which the equipment is calibrated. That is, the meter 22 responds to the difference in the magnitudes of currents transmitted by the two diodes and obviously this difference is greater for any given deviation in frequency when the intensity of oscillations supplied to the transformer 8 is large than when it is small. Accordingly, it is desirable to provide means for indicating the intensity of the oscillations supplied to the transformer 8 in order that these oscillations may be of a proper level when frequency is determined from the instrument 22. To this end the instrument 25 is provided and is connected in series with resistances 26 and 27 across the two resistances 20 and 21. The resistances 26 and 27 are of a high value relative to resistances 20 and 21 so that the voltage across the resistances 20 and 21 is not affected by the branch circuit comprising resistances 26, 27 and the instrument 25. The instrument 25 thus acts as the usual voltmeter across resistances 20 and 21 and produces an indication in accordance with the sum of the voltages across these two resistances since these voltages are applied to the instrument in aiding polarity. Thus in determining the frequency, one may first adjust by any suitable means, not shown, the intensity of oscillations supplied to the transformer 8 to a suitable predetermined value which may be read upon the instrument 25. The frequency may then be read directly from the instrument 22.

It will be observed that if the frequency increases, the voltage on one of the two resistances 20 and 21 increases, whereas that on the other decreases by the same amount. Thus the voltage applied to the instrument 25 is not affected by change in frequency and the reading of this instrument remains constant with respect to frequency. It thus is not affected by any modulation of the frequency as by desired signals to be transmitted from the transmitter.

I have found that with the diodes poled in the same sense around the loop 11, 14, 20, 21, 15, as described in accordance with my invention, and with the frequency-indicating instrument, which may be one of the usual high sensitivity microammeter type, connected in series with the two diodes as described in connection with the instrument 22, a very great improvement in sensitivity of the frequency indication may be secured. The sensitivity required of instrument 22, however, is not such but that a meter of sufficient ruggedness for ready shipment, etc., in commercial use may be employed. I have found that with my invention the sensitivity may be as much as ten times as great as that which may be obtained with the diodes poled in reverse sense around the loop 11, 14, 20, 21, 15 as in previous devices, and with an instrument connected across the resistances 20 and 21 in series to indicate frequency.

If the carrier wave, the average frequency of which is to be monitored, is modulated in frequency as by voice or music, the instrument 22 indicates the average frequency of the wave. This is by reason of the linear characteristic of the system with respect to applied frequency and the difference in rectified currents flowing in the two diodes and by reason of the fact that the instrument 22 is by-passed for voice or music currents by condenser 36. Meter 22 thus has no response to such voice or music currents and responds only to the average of the difference in rectified currents.

It is desirable that the circuit including transformer 8, the diodes, and diode loads, be designed with low impedances. This is desirable both with respect to the transformer and the resistances 20 and 21. By making the transformer windings of low impedance they may be small and of such inductance that the capacitances required to tune them are large with respect to tube and wiring capacitances with the result that variation in tube and wiring capacitances have less effect upon the accuracy of the system. Since the resistances 20 and 21 are small, as of the order of five thousand ohms each, increased current, and hence increased sensitivity of the system results.

Frequently, it is desirable to measure the magnitude of the opposite peaks of modulation of the frequency modulation transmitter. For this reason, resistances 23 and 29 are inserted in the circuit with their intermediate point grounded. There opposite points may then be connected to respective stationary contacts of a two-way switch 30 having a movable contact connected through a voltage-responsive indicating instrument 31 to ground. Thus this instrument may be connected to respond to the voltage on either resistance 23 or 29 to indicate the peak value of voltage produced thereon during the respective opposite peaks of modulation of the transmitted wave. Audio frequency currents may, if desired, be lead off by conductors 40.

As ordinarily employed, the transformer 8 of my invention may have its windings tuned to a frequency M equal to one-tenth of the frequency of the transmitter to be monitored. The crystal oscillator 4 may then operate at this frequency M. The harmonic amplifier 5 may produce a ninth harmonic 9M of this frequency, which harmonic when combined with oscillations of the transmitter again produce oscillations of the frequency M in the circuits of the transformer 8.

If it be desired to calibrate the equipment, switch 33 may be thrown to its upper position thereby to connect the crystal oscillator directly to the mixer whereby oscillations of the frequency M are obtained and supplied through the detector to the transformer 8. Calibration may then be effected by adjustment of trimmer condensers 19 and 12 until the meter 22 reads zero, or its index occupies the center of its scale.

It sometimes becomes necessary to change diodes 14 and 15 by reason of their becoming defective or burning out. Such change may alter the capacity across the secondary winding and cause inaccurate reading of meter 22. Such inaccuracy may be corrected by adjustment of condenser 12 to recalibrate the instrument. Adjustment of condenser 12 also may correct for changes in circuit capacitance by reason of temperature variation. If on the other hand the primary circuit capacity changes for any reason it may be corrected by adjustment of trimmer condenser 10.

In Fig. 2 I have shown an arrangement whereby the adaptability of the system for commercial exploitation to monitor transmitters of different frequency is somewhat improved. In this figure all of the equipment of Fig. 1 with the exception of the transmitter 1, oscillator 4 and the harmonic amplifier 5 are represented by the rectangle 35 and all of this equipment may be manufactured according to the same specifications and for operation at the same frequency irrespective of the frequency F of the transmitter to be monitored. A crystal oscillator 34 may then be supplied by the manufacturer of the monitor equipment and adapted to operate at a frequency $$\frac{F-M}{9}$$

where F is the frequency of the transmitter to be monitored and M is the frequency at which the monitor is adapted to operate. The harmonic amplifier may then be adapted to produce a frequency which is the ninth harmonic of this frequency $$\frac{F-M}{9}$$

or $F-M$. This frequency $F-M$ is supplied to the mixer through the switch 33 in its upper position where it is combined with the frequency F to produce the frequency M supplied to the monitor.

If the frequency indicating circuit is to be calibrated, switch 33 may be thrown to its lower position in which case oscillations of the frequency M supplied by crystal oscillator 34 are supplied to the monitor for calibration purposes as before.

Thus, with the arrangement of Fig. 2 the manufacturer need manufacture but one monitor adjusted for operation at a single frequency, but which with the equipment 34 and 35, which may also be supplied with the monitor is adapted to monitor transmitters of widely different frequency.

While I have shown particular embodiments of my invention, it will of course be understood that I do not wish to be limited thereto since different modifications may be made both in the circuit arrangement and in the instrumentality employed and I contemplate by the appended claims to cover any such modifications as fall within the true spirit and scope of my invention.

What I claim as new and desire to secure by Letters Patent of the United States is:

1. The combination, in a frequency monitor, of a transformer and a pair of rectifiers, said transformer having a primary winding and a pair of secondary windings, said primary and secondary windings being tuned to the frequency to be monitored, means to supply the voltage of said primary winding and one of said secondary windings across one of said rectifiers and the voltage of said primary winding and the other of said secondary windings across the other of said rectifiers, an indicating instrument connected in series with both rectifiers to carry substantially the entire current therein, said rectifiers being poled to produce unidirectional current of opposed polarity in said instrument and said secondary windings being poled to increase the voltage on one rectifier and decrease that on the other in response to change in frequency of voltage on said primary whereby when oscillations having the frequency to be monitored are supplied to said primary winding zero current exists in said indicating instrument and the current in said instrument changes in polarity and intensity in response to the direction and extent of any change in said frequency.

2. The combination, in a frequency monitor, of a transformer having a primary winding and a pair of secondary windings, a pair of rectifiers, one electrode of each rectifier being connected to one terminal of said primary winding and the other terminal of said primary winding being connected through the respective secondary windings to corresponding opposite electrodes in said rectifiers, said primary and secondary windings being tuned to the frequency to be monitored, individual resistances in series with said rectifiers, a current responsive indicating instrument in series with both rectifiers, said rectifiers being poled to transmit current in opposite directions through said indicating instrument, and a voltage responsive indicating instrument connected across said two resistances to respond to the sum of the voltage thereon whereby the intensity of current in said primary winding may be determined from said voltage-responsive instrument and its frequency may be determined from said current responsive instrument.

3. The combination, in a frequency monitoring device, of a transformer having a primary winding and a plurality of secondary windings tuned to the frequency to be monitored, a pair of rectifiers, means to supply to each rectifier the voltage of said primary winding and a corresponding one of said secondary windings, said secondary windings being poled to increase the voltage on one of said rectifiers and decrease it on the other in response to the same change in frequency of oscillations supplied to said transformers, said secondary windings and said rectifiers being connected in series about a loop circuit, said rectifiers being poled in the same direction about said loop, and a common direct current return path for said rectifiers, said common return path including means responsive to the average current therein to indicate the mean frequency tof the voltage supplied to said transformer.

4. The combination, in a frequency monitoring device, of a transformer having a primary winding and a plurality of secondary windings tuned to the frequency to be monitored, a pair of rectifiers, means to supply to each rectifier the voltage of said primary winding and a corresponding one of said secondary windings, said secondary windings being poled to increase the voltage on one of said rectifiers and decrease it on the other in response to the same change in frequency of oscillations supplied to said transformers, said secondary windings and said rectifiers being connected in series about a loop circuit, said rectifiers being poled in the same direction about said loop, and a common direct current return path for said rectifiers, including an instrument having an index arranged to deflect from a position corresponding to the frequency to which said windings are tuned in either direction in response to the polarity and magnitude of direct current in said return path and in accordance with the frequency of oscillations supplied to said windings.

5. The combination, in a frequency monitoring device, of a transformer having a primary winding and a plurality of secondary windings tuned to the frequency to be monitored, a pair of rectifiers, means to supply to each rectifier the voltage of said primary winding and a corresponding one of said secondary windings, said secondary windings being poled to increase the voltage on one of said rectifiers and decrease it on the other in response to the same change in frequency in oscillations supplied to said transformers, said secondary windings and said rectifiers being connected in series about a loop circuit, said rectifiers being poled in the same direction about said loop, a common direct current return path for said rectifiers extending from a point intermediate said resistances to electrodes of said rectifiers opposite the electrodes connected to said resistances, and means responsive to voltage across said two resistances in series to indicate the intensity of voltage supplied to said transformer whereby the indication of said means is independent of the frequency of said voltage.

6. In combination, a radio frequency transformer for frequency modulated carrier waves, said radio frequency transformer having a primary winding and a plurality of secondary windings tuned to the mean frequency of said carrier wave, a pair of rectifiers, means to supply to each rectifier the voltage of said primary winding and a corresponding one of said secondary windings, said secondary windings being poled to increase the voltage on one of said rectifiers and decrease it on the other in response to the same change in frequency of said carrier wave, said secondary windings and said rectifiers being connected in series about a loop circuit, and said rectifiers being poled in the same direction about said loop, a common return path connected across both of said rectifiers in parallel, said path including an impedance and audio output means connected across a portion of said impedance to receive currents corresponding to the audio modulations of said radio frequency carrier wave.

HARRY R. SUMMERHAYES, Jr.